US007991948B2

(12) United States Patent
Levine

(10) Patent No.: US 7,991,948 B2
(45) Date of Patent: Aug. 2, 2011

(54) OPTIMIZING EXECUTION OF I/O REQUESTS FOR A DISK DRIVE IN A COMPUTING SYSTEM

(75) Inventor: Frank E. Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 12/022,867

(22) Filed: Jan. 30, 2008

(65) Prior Publication Data

US 2009/0193188 A1 Jul. 30, 2009

(51) Int. Cl.
*G06F 13/00* (2006.01)

(52) U.S. Cl. . 711/112; 711/158; 711/168; 711/E12.019; 710/6

(58) Field of Classification Search .................. 711/112; 360/78.4
See application file for complete search history.

(56) References Cited

U.S. PATENT DOCUMENTS

| | | | |
|---|---|---|---|
| 6,442,647 B1 * | 8/2002 | Morton et al. ................. | 711/112 |
| 6,515,819 B1 * | 2/2003 | Schmidt et al. ............ | 360/78.04 |
| 7,167,959 B2 * | 1/2007 | Lin ............................... | 711/158 |
| 7,373,460 B2 * | 5/2008 | Kobayashi et al. ........... | 711/137 |
| 7,574,538 B1 * | 8/2009 | Yochai ........................... | 710/52 |
| 2001/0034811 A1 * | 10/2001 | Basham et al. ............... | 711/111 |
| 2002/0091882 A1 * | 7/2002 | Espeseth et al. .................. | 710/6 |
| 2003/0023778 A1 * | 1/2003 | Berning et al. ................... | 710/5 |
| 2004/0088478 A1 * | 5/2004 | Hall ............................... | 711/112 |
| 2004/0148543 A1 * | 7/2004 | Eto et al. ........................... | 714/5 |
| 2004/0210711 A1 * | 10/2004 | Kakihara et al. ............. | 711/112 |

OTHER PUBLICATIONS http://www.pdl.cmu.edu/PDL-FTP/Database/schlosser-fast05.pdf.
http://www.pdl.cmu.edu/PDL-FTP/Database/CMU-PDL-05-102_abs.shtml.

* cited by examiner

*Primary Examiner* — Shane M Thomas
*Assistant Examiner* — Sean Rossiter
(74) *Attorney, Agent, or Firm* — DeLizio Gilliam, PLLC

(57) ABSTRACT

Methods, apparatus, and products are disclosed for optimizing execution of Input/Output ('I/O') requests for a disk drive in a computing system that include: receiving I/O requests specifying disk blocks of the disk drive for access, each disk block specified by a disk drive head, a cylinder, and a sector of the disk drive; determining I/O sub-requests from the I/O requests, each I/O sub-request specifying a set of adjacent disk blocks along the same cylinder; determining execution sequences for performing the I/O sub-requests; calculating, for each execution sequence, a total estimated execution time for performing the I/O sub-requests according to that execution sequence; selecting one of the execution sequences for performing the I/O sub-requests in dependence upon the total estimated execution times for the execution sequences; and instructing a disk drive controller to perform the I/O requests by performing the I/O sub-requests according to the selected execution sequence.

18 Claims, 3 Drawing Sheets

OPTIMIZING EXECUTION OF I/O REQUESTS FOR A DISK DRIVE IN A COMPUTING SYSTEM

BACKGROUND OF THE INVENTION

1. Field of the Invention

The field of the invention is data processing, or, more specifically, methods, apparatus, and products for optimizing execution of Input/Output ('I/O') requests for a disk drive in a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in optimizing execution of I/O requests for a disk drive in a computing system. A disk drive device driver or a disk drive controller often has many I/O requests to process at any given moment. Each of the I/O requests specifies one or more physical disk blocks of the disk drive to access. Due to seek time, settle time, and rotational latency present when executing any I/O request, accessing disk blocks of a particular I/O request in the order in which that I/O request specifies the disk blocks is typically not efficient. Similarly, processing the I/O requests in the order in which the requests were received from the operating system is also typically not efficient.

SUMMARY OF THE INVENTION

Methods, apparatus, and products are disclosed for optimizing execution of Input/Output ('I/O') requests for a disk drive in a computing system that include: receiving, by an I/O optimization module, one or more I/O requests specifying a plurality of disk blocks of the disk drive for access, each disk block specified by a disk drive head, a cylinder, and a sector of the disk drive; determining, by the I/O optimization module, a plurality of I/O sub-requests from the I/O requests, each I/O sub-request specifying a set of one or more adjacent disk blocks specified by the I/O requests along the same cylinder; determining, by the I/O optimization module, a plurality of execution sequences for performing the I/O sub-requests; calculating, by the I/O optimization module for each execution sequence, a total estimated execution time for performing the I/O sub-requests according to that execution sequence; selecting, by the I/O optimization module, one of the plurality of execution sequences for performing the I/O sub-requests in dependence upon the total estimated execution times for the plurality of execution sequences; and instructing, by the I/O optimization module, a disk drive controller to perform the I/O requests by performing the I/O sub-requests according to the selected execution sequence.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
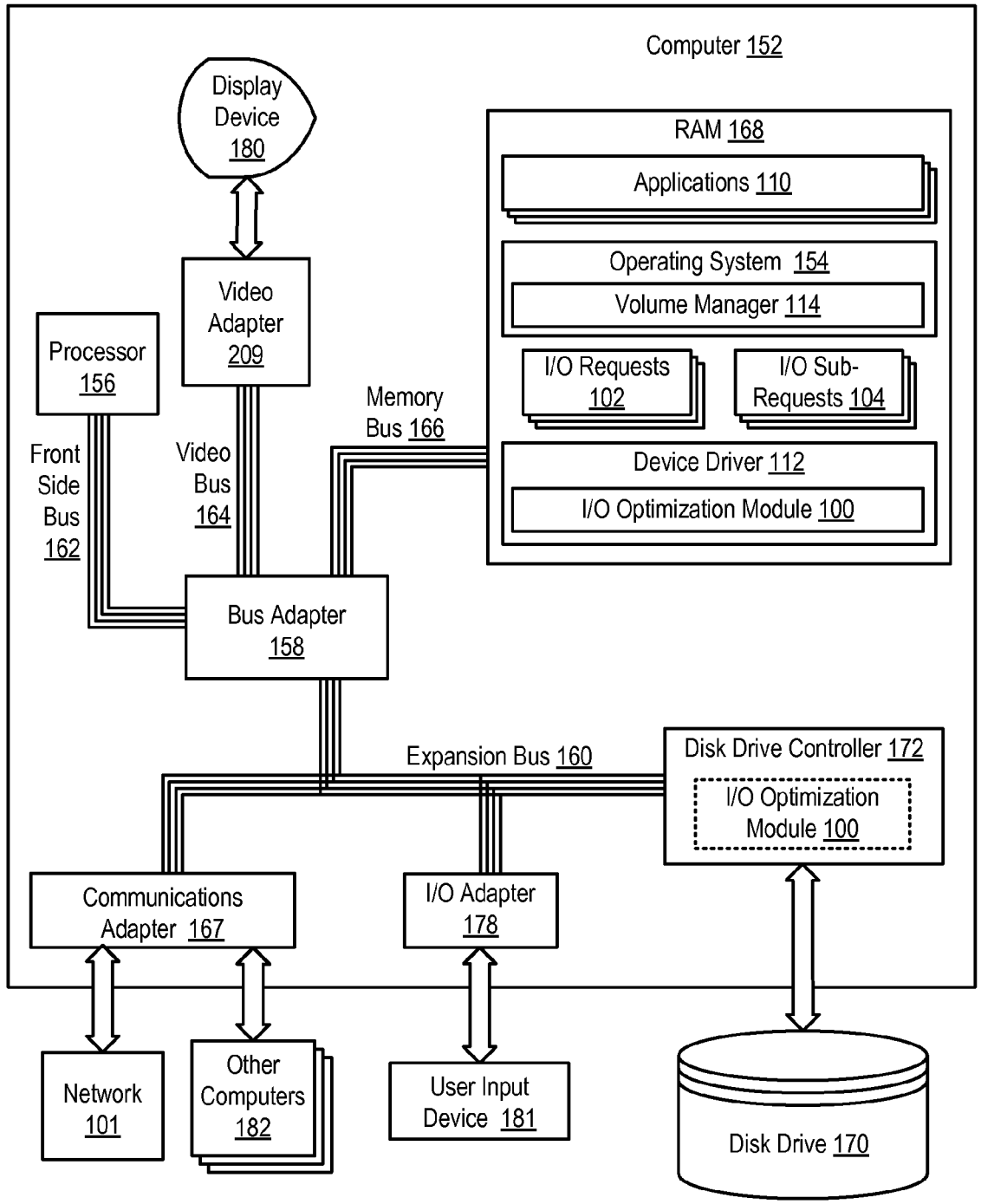
FIG. 1 sets forth a block diagram of automated computing machinery comprising an exemplary computer useful in optimizing execution of I/O requests for a disk drive in a computing system according to exemplary embodiments of the present invention.

Exemplary methods, apparatus, and products for optimizing execution of I/O requests for a disk drive in a computing system in accordance with the present invention are described with reference to the accompanying drawings, beginning with FIG. 1. Optimizing execution of I/O requests for a disk drive in a computing system in accordance with embodiments of the present invention is generally implemented with computers, that is, with automated computing machinery. For explanation, therefore, FIG. 1 sets forth a block diagram of automated computing machinery comprising an exemplary computer (152) useful in optimizing execution of I/O requests for a disk drive in a computing system according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer.

Stored in RAM (168) are device driver (112) and an operating system (154). The device driver (112) is a module of computer program instructions that provides an interface for the disk drive controller (172) and disk drive (170) to the operating system (154). The device driver (112) of FIG. 1 translates instructions from the operating system (154) into the instructions acceptable to a disk drive controller (172) and a disk drive (170). Operating systems useful in computers according to embodiments of the present invention include UNIX™, Linux™, Microsoft Vista™ Microsoft XP™, AIX™, IBM's i5/OS™, and others as will occur to those of skill in the art. Operating system (154), device driver (154), and other components in the example of FIG. 1 are shown in RAM (168), but many components of such software typically are stored in non-volatile memory also, for example, on a disk drive (170).

In the example of FIG. 1, the disk drive (170) comprises a plurality of platters. Each platter is divided into concentric, circular tracks and is divided into sectors. The intersection of the circular tracks and the sectors on a one side of a platter form 'disk blocks' that are used to store information. A cylinder represents a collection of tracks aligned through the stack of platters on the disk drive (170). The number of cylinders of a disk drive, then, exactly equals the number of tracks on a single platter in the drive. Data is written to and read from the surface of a platter by a device called a disk drive head. Each platter has two sides, each side having a disk drive head for writing to and reading from one side of the platter.

In the exemplary system of FIG. 1, the device driver (112) includes an I/O optimization module (100). The I/O optimization module (100) of FIG. 1 is a set of computer program instructions for optimizing execution of I/O requests for a disk drive in a computing system according to embodiments of the present invention. The I/O optimization module (100) of FIG. 1 optimizes execution of I/O requests for a disk drive in a computing system according to embodiments of the present invention by: receiving one or more I/O requests (102) specifying a plurality of disk blocks of the disk drive for access, each disk block specified by a head, a cylinder, and a sector of the disk drive; determining a plurality of I/O sub-requests (104) from the I/O requests (102), each I/O sub-request (104) specifying a set of one or more adjacent disk blocks specified by the I/O requests (102) along the same cylinder; determining a plurality of execution sequences for performing the I/O sub-requests (104); calculating, for each execution sequence, a total estimated execution time for performing the I/O sub-requests (104) according to that execution sequence; selecting one of the plurality of execution sequences for performing the I/O sub-requests (104) in dependence upon the total estimated execution times for the plurality of execution sequences; and instructing a disk drive controller to perform the I/O requests (102) by performing the I/O sub-requests (104) according to the selected execution sequence.

An I/O request is a request to read from or write to a plurality of disk blocks of a disk drive. Each disk block is specified by a disk drive head, a cylinder, and a sector of the disk drive. That is, an I/O request may include an identification of actual physical locations on the disk drive. An I/O request may specify a plurality of disk blocks using identifiers for the cylinder, the head, and the sector that uniquely identifies each disk block in the disk drive (170). In another embodiment, however, an I/O request may specify the disk blocks for access using a Relative Block Address ('RBA') or a Logical Block Address ('LBA') for each disk block. Regardless of the manner in which an I/O request specifies a set of disk blocks, however, each disk block is specified by a disk drive head, a cylinder, and a sector of the disk drive that indicates the disk block's physical location in the disk drive.

The I/O optimization module (100) configured in the device driver (112) of FIG. 1 may receive I/O requests (102) from a volume manager (114) configured as part of the operating system (154). The volume manager (114) of FIG. 1 is a module of computer program instructions that allocates space on a disk drive and presents the disk drive (170) as a collection of virtual partitions. The volume manager (114) receives requests from user-level applications (110) to read data from and write data to the disk drive (170). These requests typically include an identification of the virtual partition to which the data is to be read from or written to. The volume manager uses a map associating the virtual partition to actual physical locations on the disk drive to allocate disk space. That is, the volume manager uses the map to convert software applications' disk read and disk write requests, including an identification of a virtual partition, to an I/O request that specifies the actual physical disk blocks for access in the disk drive (170).

The plurality of disk blocks specified by one or more I/O requests (102) may be scattered throughout the platters of the disk drive (170) into groups of one or more adjacent disk blocks along the same cylinder. As mentioned above, the I/O optimization module (100) may determine a plurality of I/O sub-requests (104) from the I/O requests (102), and each I/O sub-request (104) represents a request to read data from or write data to the disk blocks in one of these groups. Each I/O sub-request (104) therefore is a request to read from or write to one or more adjacent disk blocks along the same cylinder. That is, each I/O sub-request (104) specifies disk blocks that are configured next to one another, without any gaps between disk blocks, on the same track and the same side a disk drive platter.

As mentioned above, the I/O optimization module (100) calculates total estimated execution times for performing the I/O sub-requests (104) in various execution sequences. The I/O optimization module (100) then selects one of the execution sequences and instructs a disk drive controller to perform the I/O requests (102) by performing the I/O sub-requests (104) according to the selected execution sequence. When taken together, all of the I/O sub-requests (104) access the same disk blocks specified by the one or more I/O requests (102). The order in which the disk drive controller (172) performs the I/O sub-requests (104), however, affects the total time required to access the disk blocks specified by the I/O requests (102) because of the latency that occurs transitioning the disk drive heads from one cylinder to another, waiting for the disk drive head to stabilize in a particular cylinder, and waiting for the sector containing the target disk block rotates into a position accessible by the disk drive heads.

Although the explanation above describes the I/O optimization module (100) as a component of the device driver (112), readers will note that such an example is for explanation only and not for limitation. In fact, the I/O optimization module (100) may be implemented as a component stored in memory of the disk drive controller (172), as indicated by the dotted box in FIG. 1. In such an embodiment, an on-board processor for the disk drive controller (172) may provide the processing resources for executing the I/O optimization module (100).

The computer (152) of FIG. 1 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful for optimizing execution of I/O requests for a disk drive in a computing system according to embodiments of the present invention include the Intel Northbridge, the Intel Memory Controller Hub, the Intel Southbridge, and the Intel I/O Controller Hub. Examples of expansion buses useful for optimizing execution of I/O requests for a disk drive in a computing system according to embodiments of the present invention include Industry Standard Architecture ('ISA') buses and Peripheral Component Interconnect ('PCI') buses.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for optimizing execution of I/O requests for a disk drive in a computing system according to embodiments of the present invention include modems for wired dial-up communications, Ethernet (IEEE 802.3) adapters for wired data communications network communications, and 802.11 adapters for wireless data communications network communications.

Figure 2:
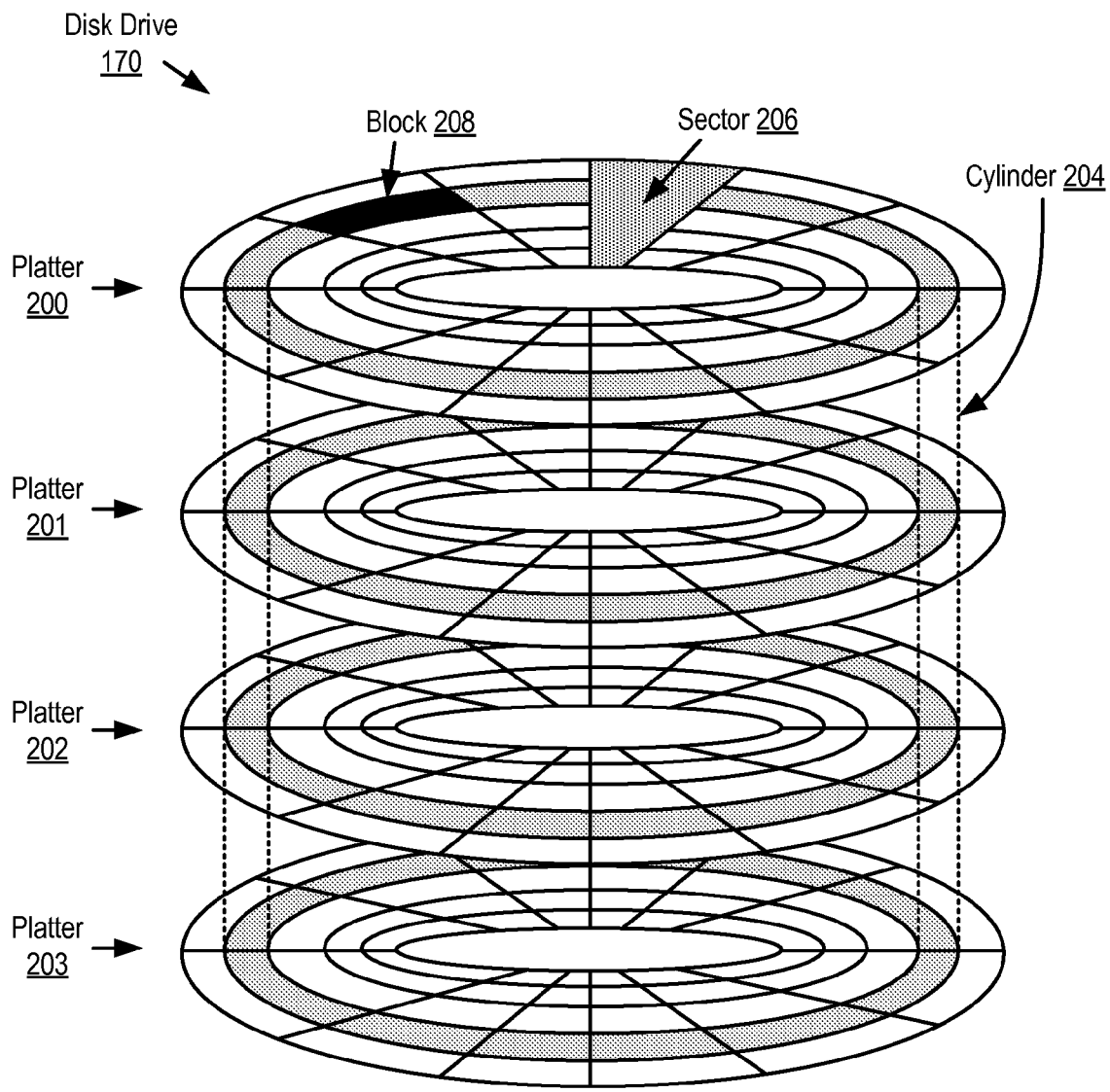
FIG. 2 sets forth a block diagram of disk drive useful in optimizing execution of I/O requests for a disk drive in a computing system according to exemplary embodiments of the present invention.

For further explanation, FIG. 2 sets forth a block diagram of disk drive (170) useful in optimizing execution of I/O requests for a disk drive in a computing system according to embodiments of the present invention. In the example of FIG. 2, the disk drive (170) includes four platters (200-203). Each side of each platter (200-203) of FIG. 2 is divided into concentric, circular tracks. A collection of tracks aligned vertically throughout the stack of platters (200-203) forms a cylinder. Because a cylinder is a collection of tracks aligned vertically throughout the disk drive, readers will note that the number of cylinders of the disk drive (170) exactly equals the number of tracks on a single platter in the drive. For example, FIG. 2 illustrates a cylinder (204) as the set of grey tracks around each platter (200-203).

In the example of FIG. 2, each side of each platter (200-203) is divided into sectors that radiate out from the center of a platter to that platter's edge. For example, FIG. 2 illustrates a sector (206) as the dotted region of the platter (200). The intersection of sectors and cylinder along the surface of a platter form 'disk blocks' that are used to store information. For example, FIG. 2 illustrates a disk block (208) as the black region of the platter (200). Although each cylinder in the example of FIG. 2 includes the same number of disk blocks, readers will note that such an embodiment for explanation only and not for limitation. In some embodiments, the cylinders that intersect the outer portions of the platters may have more disk blocks than the cylinders that intersect the inner portions of the platters.

In the example of FIG. 2, each side of each platter (200-203) has a disk drive head (not shown) used to access disk blocks on that side of the disk drive platter. In the example of FIG. 2, the disk drive (170) includes eight disk drive heads, one head for each side of each platter (200-203). Each disk drive head writes date to and reads data from the surface of one of the platters.

Figure 3:
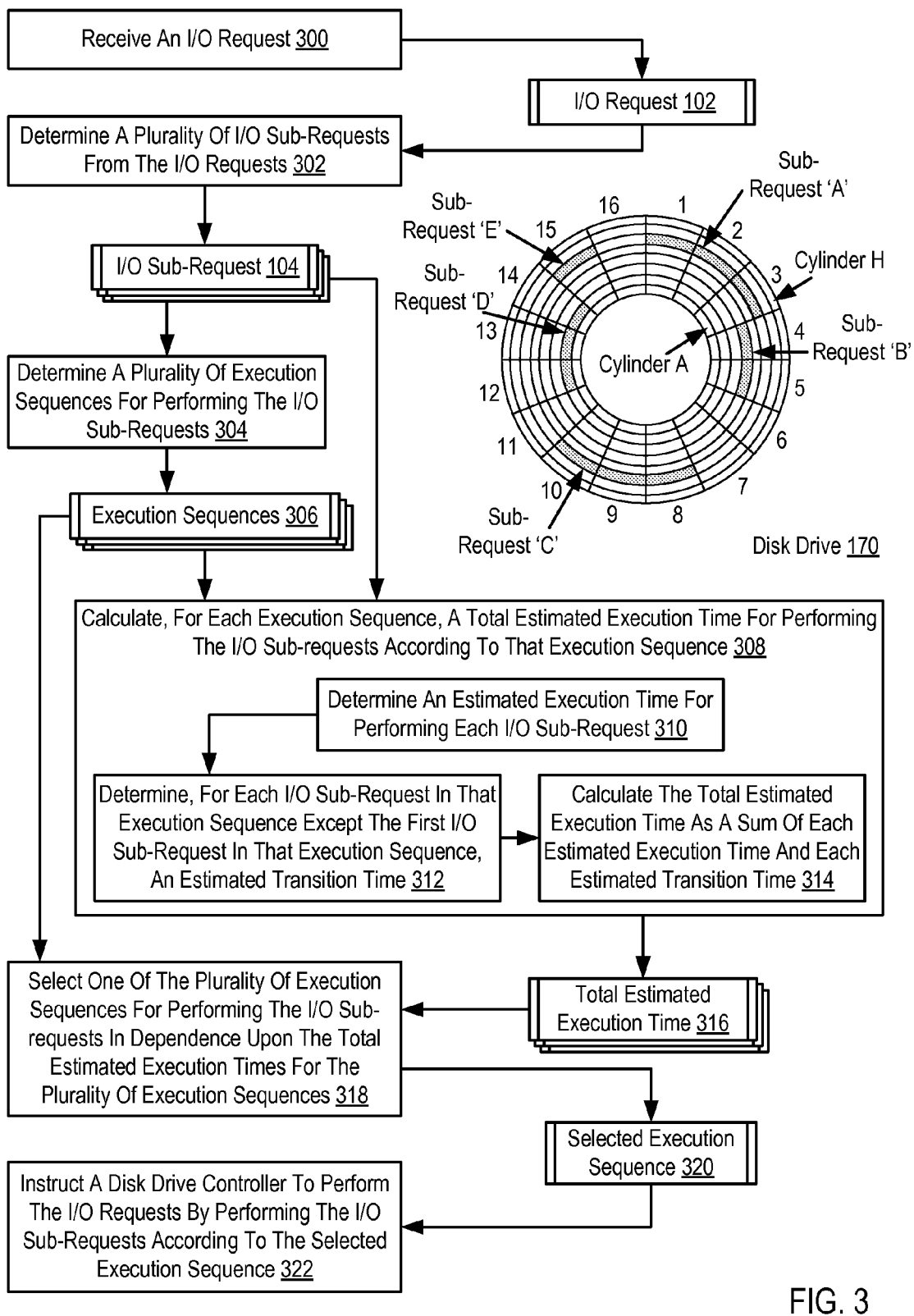
FIG. 3 sets forth a flow chart illustrating a further exemplary method for optimizing execution of I/O requests for a disk drive in a computing system according to exemplary embodiments of the present invention.

For further explanation, FIG. 3 sets forth a flow chart illustrating a further exemplary method for optimizing execution of I/O requests for a disk drive in a computing system according to embodiments of the present invention. The method of FIG. 3 includes receiving (300), by an I/O optimization module, an I/O request (102) specifying a plurality of disk blocks of the disk drive for access. When the I/O optimization module is implemented as a component in a device driver, the I/O optimization module may receive (300) an I/O request (102) according to the method of FIG. 3 from a volume manager of the computing system's operating system.

When the I/O optimization module is directly implemented as a component of a disk drive controller, the I/O optimization module may receive (300) an I/O request (102) according to the method of FIG. 3 from a device driver for the disk drive controller.

The I/O request (102) of FIG. 3 specifies a plurality of disk blocks of the disk drive for access. Each disk block is specified by a disk drive head, a cylinder, and a sector of the disk drive. For example, FIG. 3 illustrates one side a platter in a disk drive (170) that contains the disk blocks specified by the I/O request (102). The disk blocks specified by the I/O request (102) are illustrated in FIG. 3 by the grey regions of the platter for disk drive (170). That is, the I/O request (102) of FIG. 3 specifies accessing twelve disk blocks located at:
- cylinder B, sectors 12-14;
- cylinder D, sectors 4-5; and
- cylinder F, sectors 1-3, 8-10, and 15.

Readers will note that the disk block locations above omit the reference to a disk drive head. Such an omission is for clarity because only one side of a disk drive platter is depicted in FIG. 3. Readers will note, however, that disk blocks are in fact specified by a cylinder, a disk drive sector, and a disk drive head that indicates on which side of which platter the disk block is located.

The method of FIG. 3 includes determining (302), by the I/O optimization module, a plurality of I/O sub-requests (104) from the I/O request (102). The I/O optimization module may determine (302) a plurality of I/O sub-requests (104) from the I/O request (102) according to the method of FIG. 3 by sorting all of the disk blocks specified by the I/O request (102) by each block's corresponding disk drive head and then by each block's corresponding cylinder, and then by each block's corresponding sectors. The I/O optimization module may then determine (302) a plurality of I/O sub-requests (104) from the I/O request (102) according to the method of FIG. 3 by selecting groups of disk blocks such that all the disk blocks in a group correspond to the same disk drive head and cylinder and all the disk blocks in the group are located in sectors that are adjacent to one another without any gaps between sectors. After selecting the groups of disk blocks, the I/O optimization module may then determine (302) a plurality of I/O sub-requests (104) from the I/O request (102) according to the method of FIG. 3 by creating an I/O sub-request for each selected group of disk blocks.

Each I/O sub-request (104) of FIG. 3 specifies a set of one or more adjacent disk blocks specified by the I/O requests (102) along the same cylinder. For example, consider the adjacent disk blocks specified by the exemplary I/O sub-requests 'A,' 'B,' 'C,' 'D,' and 'E' illustrated in FIG. 3. The exemplary I/O sub-request 'A' specifies adjacent disk blocks in cylinder F, sectors 1-3. The exemplary I/O sub-request 'A' specifies adjacent disk blocks in cylinder D, sectors 4-5. The exemplary I/O sub-request 'C' specifies adjacent disk blocks in cylinder F, sectors 8-10. The exemplary I/O sub-request 'D' specifies adjacent disk blocks in cylinder B, sectors 12-14. The exemplary I/O sub-request 'E' specifies adjacent disk blocks in cylinder F, sector 15.

The method of FIG. 3 also includes determining (304), by the I/O optimization module, a plurality of execution sequences (306) for performing the I/O sub-requests (104). Each execution sequence (306) of FIG. 3 represent the order in which the I/O sub-requests (104) are performed by a disk controller to access the disk blocks specified by each I/O sub-request (104). As mentioned above, the order in which the disk drive controller performs the I/O sub-requests (104) affects the total time required to access all of the disk blocks because of the disparate locations of the disk blocks in the disk drive (170). The I/O optimization module may determine (304) a plurality of execution sequences (306) for performing the I/O sub-requests (104) according to the method of FIG. 3 by identifying possible permutations for the set of I/O sub-requests (104). For example, consider the exemplary I/O sub-requests 'A,' 'B,' 'C,' 'D,' and 'E' illustrated in FIG. 3 and the following exemplary execution sequences:

A→B→C→D→E
A→B→C→E→L→D
A→B→E→L→C→D
A→E→L→B→C→D
E→L→A→B→C→D
. . .

Although only five permutations for the set of exemplary I/O sub-requests are illustrated above, readers will note that in fact 120 permutations for the set of exemplary I/O sub-requests 'A,' 'B,' 'C,' 'D,' and 'E' exists. Readers will also note that the exemplary I/O sub-requests illustrated in FIG. 3 are for explanation only and not for limitation and that heuristics, which estimate costs for some of the permutations, may be used to reduce the actual set of permutations used as execution sequences.

The method of FIG. 3 includes calculating (308), by the I/O optimization module for each execution sequence (306), a total estimated execution time (316) for performing the I/O sub-requests (104) according to that execution sequence (306). The I/O optimization module may calculate (308) a total estimated execution time (316) for performing the I/O sub-requests (104) according to each execution sequence (306) according to the method of FIG. 3 by: determining (310) an estimated execution time for performing each I/O sub-request (104); determining (312), for each I/O sub-request (104) in that execution sequence (306) except the first I/O sub-request in that execution sequence, an estimated transition time for transitioning a disk drive head from a location upon completing the previous I/O sub-request to a new location for performing that I/O sub-request; and calculating (314) the total estimated execution time (316) as a sum of each estimated execution time and each estimated transition time.

For each execution sequence (306), the I/O optimization module may determine (310) an estimated execution time for performing each I/O sub-request (104) according to the method of FIG. 3 by calculating the estimated execution time for performing each I/O sub-request as the estimated time required for each of the disk blocks specified by that I/O sub-request to pass by the disk drive head used to perform that I/O sub-request. Because the disk blocks specified by any I/O sub-request are located in the same cylinder and are adjacent to one another, the time required for all of the disk blocks to pass by a disk drive head may be calculated as the number of disk block specified by the I/O sub-request divided by the number of disk blocks in that cylinder containing the I/O sub-request's disk blocks and divided by the frequency with which the disk drive platters rotate. Consider, for example, the exemplary I/O sub-request 'A' illustrated in FIG. 3 that specifies three disk blocks in cylinder F, which in turn contains 16 disk blocks. Further consider that the platter illustrated in FIG. 3 rotates at a frequency of 9000 revolutions per minute, or 150 revolutions per second. The time required for the three disk blocks specified by the I/O sub-request 'A' to pass by a disk drive head may be calculated according to the following formula:

$$T_{EE} = DB_{I/O\,SR} \div DB_{Cylinder} \div F_{RPS}$$

$$= 3 \text{ disk blocks} \div 16 \text{ disk blocks per cylinder revolution} \div$$

$$150 \text{ cylinder revolutions per second}$$

$$T_{EE} = .00125 \text{ seconds}$$

where $T_{EE}$ represents estimated execution time for a single I/O sub-request, $DB_{I/O\,SR}$ represents the number of disk block specified by the I/O sub-request, $DB_{Cylinder}$ represents the number of disk blocks in the cylinder containing the I/O sub-request's disk blocks, and $F_{RPS}$ represents the frequency with which the disk drive platters rotate. The number of disk blocks in that cylinder containing the I/O sub-request's disk blocks and the frequency with which the disk drive platters rotate may be stored in non-volatile memory contained in the disk drive itself. Although each cylinder in some disk drives may have the same number of disk blocks, each cylinder in other disk drives may have the different number of disk blocks per cylinder.

Readers will recall from above that total estimated execution time for performing the I/O sub-requests in a particular execution sequence may be calculated as the sum of estimated execution times for each I/O sub-request and estimated transition time for transitioning a disk drive head from a location upon completing a previous I/O sub-request in the sequence to a new location for performing the next I/O sub-request in the sequence. For each execution sequence (306), the I/O optimization module may determine (312) an estimated transition time for each I/O sub-request (104) in that execution sequence (306) except the first I/O sub-request in that execution sequence according to the method of FIG. 3 by determining whether that next I/O sub-request and the previous I/O sub-request in that execution sequence specify disk blocks in the same cylinder of the disk drive.

If that next I/O sub-request and the previous I/O sub-request in that execution sequence specify disk blocks in the same cylinder of the disk drive, then the disk drive head need only wait for the disk blocks for the next I/O sub-request to rotate into position before the next I/O sub-request of a sequence can be performed. As such, if that next I/O sub-request and the previous I/O sub-request in that execution sequence specify disk blocks in the same cylinder of the disk drive, the I/O optimization module may determine (312) an estimated transition time according to the method of FIG. 3 by calculating the estimated transition time as a rotational latency required for the sector specified by the first accessible disk block specified by that next I/O sub-request to rotate into a position accessible by the disk drive head from the disk drive head's location upon completing the previous I/O sub-request. This rotational latency may be calculated as the number of disk blocks between the disk blocks specified by the previous I/O sub-request and the next I/O sub-request divided by the number of disk blocks in that cylinder containing the I/O sub-request's disk blocks and divided by the frequency with which the disk drive platters rotate. Consider, for example, that an execution sequence specifies performing I/O sub-request 'A' followed by I/O sub-request 'B' in the example of FIG. 3. The number of disk blocks between I/O sub-requests 'A' and 'B' is four disk blocks. Further consider that cylinder F, which contains the disk blocks specified by I/O sub-requests 'A' and 'B,' includes a total of 16 disk blocks and that the platter illustrated in FIG. 3 rotates at a frequency of 9000 revolutions per minute, or 150 revolutions per second. The rotational latency therefore may be calculated according to the following formula:

$$RL = DB_{Gap} \div DB_{Cylinder} \div F_{RPS}$$
$$= 4 \text{ disk blocks} \div 16 \text{ disk blocks per cylinder revolution} \div$$
$$150 \text{ cylinder revolutions per second}$$
$$RL = .00167 \text{ seconds}$$

where RL represents rotational latency, $DB_{Gap}$ represents the number of disk blocks between the disk blocks specified by the previous I/O sub-request and the next I/O sub-request, $DB_{Cylinder}$ represents the number of disk blocks in the cylinder containing the I/O sub-request's disk blocks, and $F_{RPS}$ represents the frequency with which the disk drive platters rotate. As mentioned above, the number of disk blocks in that cylinder containing the I/O sub-request's disk blocks and the frequency with which the disk drive platters rotate may be stored in non-volatile memory contained in the disk drive itself.

If that next I/O sub-request and the previous I/O sub-request in that execution sequence do not specify disk blocks in the same cylinder of the disk drive, then the disk drive head needs to transition to a different cylinder and wait for the disk blocks for the next I/O sub-request to rotate into position before the next I/O sub-request of a sequence can be performed. As such, if that next I/O sub-request and the previous I/O sub-request in that execution sequence do not specify disk blocks in the same cylinder of the disk drive, the I/O optimization module may determine (312) an estimated transition time according to the method of FIG. 3 by calculating the estimated transition time as a seek time, a settle time, and a rotational latency. The seek time is the time required for the disk drive head to move from the disk drive head's location upon completing the previous I/O sub-request to the cylinder specified by the first accessible disk block specified by that next I/O sub-request in a sequence. The settle time is the time required for the disk drive's head to stabilize on that cylinder so that data can be written to or read from disk blocks in that cylinder. The rotational latency is the time required for the sector specified by that first accessible disk block of that next I/O sub-request to rotate into a position accessible by the disk drive head from the disk drive head's location after stabilizing on that cylinder. The seek time, the settle time, and the rotational latency components of the estimated transition time may be determined by the hard drive's manufacturer and stored in an estimated transition time table in non-volatile memory of the disk drive. In other embodiments, the seek time, the settle time, and the rotational latency components of the estimated transition time may be obtained through a data communication connection with a server for a testing lab. Still further, the seek time, the settle time, and the rotational latency components of the estimated transition time may also be obtained in other ways as will occur to those of skill in the art.

For further explanation of an estimated transition time table useful for optimizing execution of I/O requests for a disk drive in a computing system according to embodiments of the present invention, consider the following table:

TABLE 1

ESTIMATED TRANSITION TIME TABLE

| PREVIOUS DISK BLOCK | NEXT DISK BLOCK | SEEK TIME (ms) | SETTLE TIME (ms) | ROTATIONAL LATENCY (ms) |
|---|---|---|---|---|
| . . . | . . . | . . . | . . . | . . . |
| Head 0, Cylinder A, Sector 1 | Head 0, Cylinder B, Sector 1 | 1.0 | 1.0 | 2.0 |
| Head 0, Cylinder A, Sector 1 | Head 0, Cylinder C, Sector 1 | 1.5 | 1.1 | 2.0 |
| Head 0, Cylinder A, Sector 1 | Head 0, Cylinder D, Sector 1 | 2.0 | 1.2 | 2.0 |
| Head 0, Cylinder A, Sector 1 | Head 0, Cylinder E, Sector 1 | 2.5 | 1.3 | 2.0 |
| . . . | . . . | . . . | . . . | . . . |

The exemplary estimated transition time table above illustrates four entries that provide the seek time, settle time, and the rotational latency associated with transitioning a disk drive head from one particular disk block to four other disk blocks. Specifically, the exemplary transition time table above specifies that the seek time, the settle time, and the rotational latency for transitioning from the disk block specified by disk drive head 0, cylinder A, sector 1 to the disk block specified by disk drive head 0, cylinder B, sector 1 is 1.0 milliseconds, 1.0 milliseconds, and 2.0 milliseconds respectively. The exemplary transition time table above specifies that the seek time, the settle time, and the rotational latency for transitioning from the disk block specified by disk drive head 0, cylinder A, sector 1 to the disk block specified by disk drive head 0, cylinder C, sector 1 is 1.5 milliseconds, 1.1 milliseconds, and 2.0 milliseconds respectively. The exemplary transition time table above specifies that the seek time, the settle time, and the rotational latency for transitioning from the disk block specified by disk drive head 0, cylinder A, sector 1 to the disk block specified by disk drive head 0, cylinder D, sector 1 is 2.0 milliseconds, 1.2 milliseconds, and 2.0 milliseconds respectively. The exemplary transition time table above specifies that the seek time, the settle time, and the rotational latency for transitioning from the disk block specified by disk drive head 0, cylinder A, sector 1 to the disk block specified by disk drive head 0, cylinder E, sector 1 is 2.5 milliseconds, 1.3 milliseconds, and 2.0 milliseconds respectively. Readers will note that the exemplary table above is for explanation only. In other embodiments, the individual times for the seek time, settle time, and the rotational latency may not be subsumed into a single entry for the estimated transition time.

The method of FIG. 3 also includes selecting (318), by the I/O optimization module, one of the plurality of execution sequences (306) for performing the I/O sub-requests (104) in dependence upon the total estimated execution times (316) for the plurality of execution sequences (306). The I/O optimization module may select (318) one of the plurality of execution sequences (306) for performing the I/O sub-requests (104) according to the method of FIG. 3 by selecting the execution sequence (306) associated with the lowest total estimated execution time (316).

The method of FIG. 3 includes instructing (322), by the I/O optimization module, a disk drive controller to perform the I/O requests (102) by performing the I/O sub-requests (104) according to the selected execution sequence (320). The I/O optimization module may instruct (322) a disk drive controller to perform the I/O requests (102) by performing the I/O sub-requests (104) according to the selected execution sequence (320) according to the method of FIG. 3 by injecting the I/O sub-requests (104) into the execution stack of the disk drive controller in the order specified by the selected execution sequence (320).

Exemplary embodiments of the present invention are described largely in the context of a fully functional computer system for optimizing execution of I/O requests for a disk drive in a computing system. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of optimizing execution of Input/Output ('I/O') requests for a disk drive in a computing system, the method comprising:
   receiving, by an I/O optimization module, one or more I/O requests specifying a plurality of disk blocks of the disk drive for access, each disk block characterized by a disk drive head, a cylinder, and a sector of the disk drive;
   determining, by the I/O optimization module, a plurality of I/O sub-requests from the I/O requests, each I/O sub-request specifying a set of one or more adjacent disk blocks specified by the I/O requests along the same cylinder;
   determining, by the I/O optimization module, all possible execution sequences for performing the I/O sub-requests;
   calculating, by the I/O optimization module for each execution sequence, a total estimated execution time for performing the I/O sub-requests according to that execution sequence;
   selecting, by the I/O optimization module, one of the execution sequences for performing the I/O sub-requests in dependence upon the total estimated execution times for the execution sequences; and
   instructing, by the I/O optimization module, a disk drive controller to perform the I/O requests by performing the I/O sub-requests according to the selected execution sequence.

2. The method of claim 1 wherein calculating, for each execution sequence, a total estimated execution time for performing the I/O sub-requests according to that execution sequence further comprises:
   determining an estimated execution time for performing each I/O sub-request;
   determining, for each I/O sub-request in that execution sequence except the first I/O sub-request in that execution sequence, an estimated transition time for transitioning a disk drive head from a location upon completing the previous I/O sub-request to a new location for performing that I/O sub-request; and
   calculating the total estimated execution time as a sum of each estimated execution time and each estimated transition time.

3. The method of claim 2 wherein determining, for each I/O sub-request in that execution sequence except the first I/O sub-request in that execution sequence, an estimated transition time for transitioning a disk drive head from a location upon completing the previous I/O sub-request to a new location for performing that I/O sub-request further comprises:
   determining whether that I/O sub-request and the previous I/O sub-request in that execution sequence specify disk blocks in the same cylinder of the disk drive; and
   if that I/O sub-request and the previous I/O sub-request in that execution sequence specify disk blocks in the same cylinder of the disk drive, calculating the estimated transition time as a rotational latency required for the sector specified by the first accessible disk block specified by that I/O sub-request to rotate into a position accessible by the disk drive head from the disk drive head's location upon completing the previous I/O sub-request.

4. The method of claim 2 wherein determining, for each I/O sub-request in that execution sequence except the first I/O sub-request in that execution sequence, an estimated transition time for transitioning a disk drive head from a location upon completing the previous I/O sub-request to a new location for performing that I/O sub-request further comprises:
   determining whether that I/O sub-request and the previous I/O sub-request in that execution sequence specify disk blocks in the same cylinder of the disk drive; and
   if that I/O sub-request and the previous I/O sub-request in that execution sequence do not specify disk blocks in the same cylinder of the disk drive, calculating the estimated transition time as a seek time from the disk drive head's location upon completing the previous I/O sub-request to the cylinder specified by the first accessible disk block specified by that I/O sub-request, a settle time for the disk drive's head to stabilize on that cylinder, and the rotational latency required for the sector specified by that first accessible disk block specified by that I/O sub-request to rotate into a position accessible by the disk drive head from the disk drive head's location after stabilizing on that cylinder.

5. The method of claim 2 wherein determining an estimated execution time for performing each I/O sub-request further comprises calculating the estimated execution time for performing each I/O sub-request as the estimated time required for each of the disk blocks specified by that I/O sub-request to pass by the disk drive head used to perform that I/O sub-request.

6. The method of claim 1 wherein the I/O optimization module is configured in the disk drive controller.

7. The method of claim 1 wherein the I/O optimization module is configured in a device driver that administers the disk drive controller.

8. Apparatus for optimizing execution of Input/Output ('I/O') requests for a disk drive in a computing system, the apparatus comprising a computer processor, a computer memory operatively coupled to the computer processor, the computer memory having disposed within it computer program instructions capable of:

receiving, by an I/O optimization module, one or more I/O requests specifying a plurality of disk blocks of the disk drive for access, each disk block characterized by a disk drive head, a cylinder, and a sector of the disk drive;

determining, by the I/O optimization module, a plurality of I/O sub-requests from the I/O requests, each I/O sub-request specifying a set of one or more adjacent disk blocks specified by the I/O requests along the same cylinder;

determining, by the I/O optimization module, all possible execution sequences for performing the I/O sub-requests;

calculating, by the I/O optimization module for each execution sequence, a total estimated execution time for performing the I/O sub-requests according to that execution sequence;

selecting, by the I/O optimization module, one of execution sequences for performing the I/O sub-requests in dependence upon the total estimated execution times for the execution sequences; and instructing, by the I/O optimization module, a disk drive controller to perform the I/O requests by performing the I/O sub-requests according to the selected execution sequence.

9. The apparatus of claim 8 wherein calculating, for each execution sequence, a total estimated execution time for performing the I/O sub-requests according to that execution sequence further comprises:

determining an estimated execution time for performing each I/O sub-request;

determining, for each I/O sub-request in that execution sequence except the first I/O sub-request in that execution sequence, an estimated transition time for transitioning a disk drive head from a location upon completing the previous I/O sub-request to a new location for performing that I/O sub-request; and calculating the total estimated execution time as a sum of each estimated execution time and each estimated transition time.

10. The apparatus of claim 9 wherein determining, for each I/O sub-request in that execution sequence except the first I/O sub-request in that execution sequence, an estimated transition time for transitioning a disk drive head from a location upon completing the previous I/O sub-request to a new location for performing that I/O sub-request further comprises:

determining whether that I/O sub-request and the previous I/O sub-request in that execution sequence specify disk blocks in the same cylinder of the disk drive; and if that I/O sub-request and the previous I/O sub-request in that execution sequence specify disk blocks in the same cylinder of the disk drive, calculating the estimated transition time as a rotational latency required for the sector specified by the first accessible disk block specified by that I/O sub-request to rotate into a position accessible by the disk drive head from the disk drive head's location upon completing the previous I/O sub-request.

11. The apparatus of claim 9 wherein determining, for each I/O sub-request in that execution sequence except the first I/O sub-request in that execution sequence, an estimated transition time for transitioning a disk drive head from a location upon completing the previous I/O sub-request to a new location for performing that I/O sub-request further comprises:

determining whether that I/O sub-request and the previous I/O sub-request in that execution sequence specify disk blocks in the same cylinder of the disk drive; and if that I/O sub-request and the previous I/O sub-request in that execution sequence do not specify disk blocks in the same cylinder of the disk drive, calculating the estimated transition time as a seek time from the disk drive head's location upon completing the previous I/O sub-request to the cylinder specified by the first accessible disk block specified by that I/O sub-request, a settle time for the disk drive's head to stabilize on that cylinder, and the rotational latency required for the sector specified by that first accessible disk block specified by that I/O sub-request to rotate into a position accessible by the disk drive head from the disk drive head's location after stabilizing on that cylinder.

12. The apparatus of claim 9 wherein determining an estimated execution time for performing each I/O sub-request further comprises calculating the estimated execution time for performing each I/O sub-request as the estimated time required for each of the disk blocks specified by that I/O sub-request to pass by the disk drive head used to perform that I/O sub-request.

13. A computer program product for optimizing execution of Input/Output ('I/O') requests for a disk drive in a computing system, the computer program product disposed in a recordable computer readable medium, the computer program product comprising computer program instructions capable of:

receiving, by an I/O optimization module, one or more I/O requests specifying a plurality of disk blocks of the disk drive for access, each disk block characterized by a disk drive head, a cylinder, and a sector of the disk drive;

determining, by the I/O optimization module, a plurality of I/O sub-requests from the I/O requests, each I/O sub-request specifying a set of one or more adjacent disk blocks specified by the I/O requests along the same cylinder;

determining, by the I/O optimization module, all possible execution sequences for performing the I/O sub-requests;

calculating, by the I/O optimization module for each execution sequence, a total estimated execution time for performing the I/O sub-requests according to that execution sequence;

selecting, by the I/O optimization module, one of the execution sequences for performing the I/O sub-requests in dependence upon the total estimated execution times for the execution sequences; and instructing, by the I/O optimization module, a disk drive controller to perform the I/O requests by performing the I/O sub-requests according to the selected execution sequence.

14. The computer program product of claim 13 wherein calculating, for each execution sequence, a total estimated execution time for performing the I/O sub-requests according to that execution sequence further comprises:

determining an estimated execution time for performing each I/O sub-request;

determining, for each I/O sub-request in that execution sequence except the first I/O sub-request in that execution sequence, an estimated transition time for transitioning a disk drive head from a location upon completing the previous I/O sub-request to a new location for performing that I/O sub-request; and calculating the total estimated execution time as a sum of each estimated execution time and each estimated transition time.

15. The computer program product of claim 14 wherein determining, for each I/O sub-request in that execution sequence except the first I/O sub-request in that execution sequence, an estimated transition time for transitioning a disk drive head from a location upon completing the previous I/O sub-request to a new location for performing that I/O sub-request further comprises:

determining whether that I/O sub-request and the previous I/O sub-request in that execution sequence specify disk blocks in the same cylinder of the disk drive; and if that I/O sub-request and the previous I/O sub-request in that execution sequence specify disk blocks in the same cylinder of the disk drive, calculating the estimated transition time as a rotational latency required for the sector specified by the first accessible disk block specified by that I/O sub-request to rotate into a position accessible by the disk drive head from the disk drive head's location upon completing the previous I/O sub-request.

16. The computer program product of claim 14 wherein determining, for each I/O sub-request in that execution sequence except the first I/O sub-request in that execution sequence, an estimated transition time for transitioning a disk drive head from a location upon completing the previous I/O sub-request to a new location for performing that I/O sub-request further comprises:

determining whether that I/O sub-request and the previous I/O sub-request in that execution sequence specify disk blocks in the same cylinder of the disk drive; and if that I/O sub-request and the previous I/O sub-request in that execution sequence do not specify disk blocks in the same cylinder of the disk drive, calculating the estimated transition time as a seek time from the disk drive head's location upon completing the previous I/O sub-request to the cylinder specified by the first accessible disk block specified by that I/O sub-request, a settle time for the disk drive's head to stabilize on that cylinder, and the rotational latency required for the sector specified by that first accessible disk block specified by that I/O sub-request to rotate into a position accessible by the disk drive head from the disk drive head's location after stabilizing on that cylinder.

17. The computer program product of claim 14 wherein determining an estimated execution time for performing each I/O sub-request further comprises calculating the estimated execution time for performing each I/O sub-request as the estimated time required for each of the disk blocks specified by that I/O sub-request to pass by the disk drive head used to perform that I/O sub-request.

18. The computer program product of claim 13 wherein the I/O optimization module is configured in the disk drive controller.

* * * * *